Figure 1:
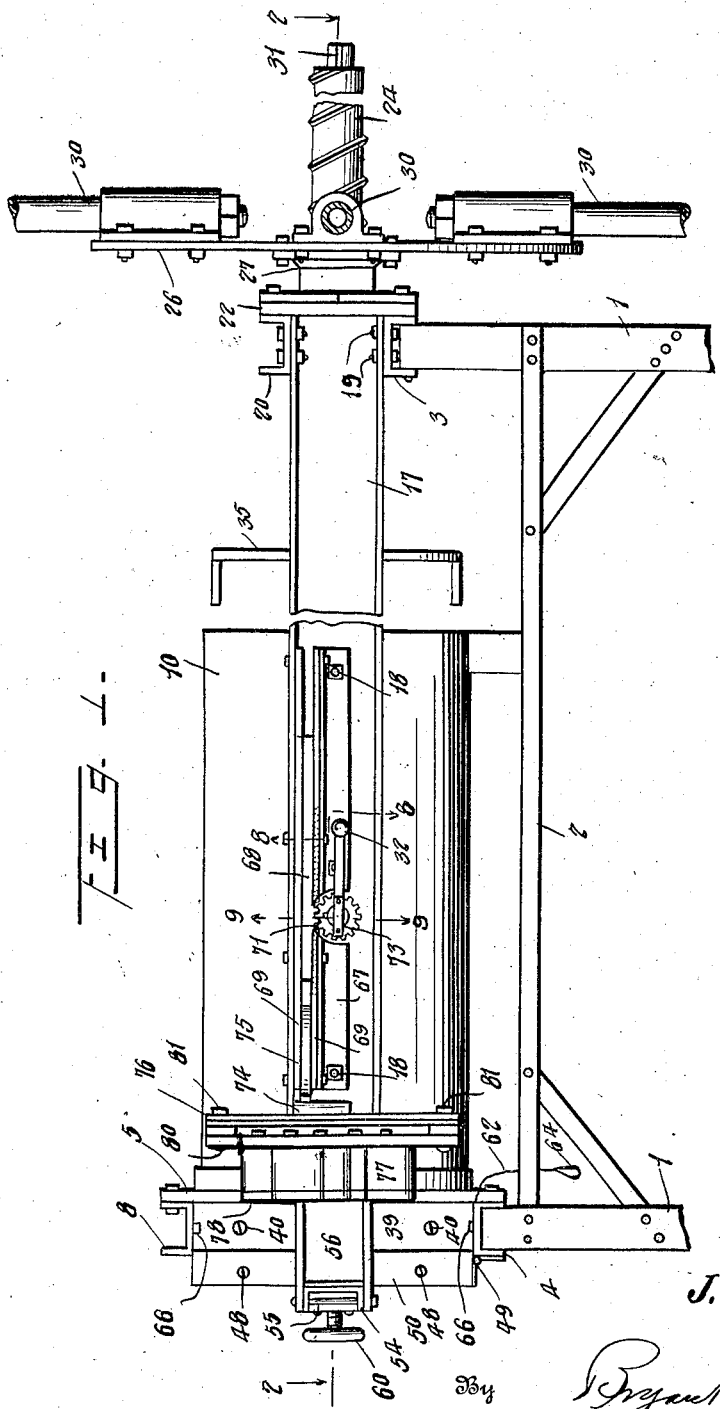

Dec. 14, 1926.

J. KOBERLING 1,610,952

TILE MOLDING MACHINE

Filed April 1, 1926    6 Sheets-Sheet 1

Inventor
J. Koberling,
By Bryant & Lowry
Attorneys

Dec. 14, 1926.

J. KOBERLING

TILE MOLDING MACHINE

Filed April 1, 1926  6 Sheets-Sheet 2

1,610,952

Inventor
J. Koberling.
By Bryant & Lowry
Attorneys

Dec. 14, 1926.

J. KOBERLING 1,610,952

TILE MOLDING MACHINE

Filed April 1, 1926   6 Sheets-Sheet 4

Inventor
J. Koberling.

By Bryant & Lowry
Attorneys

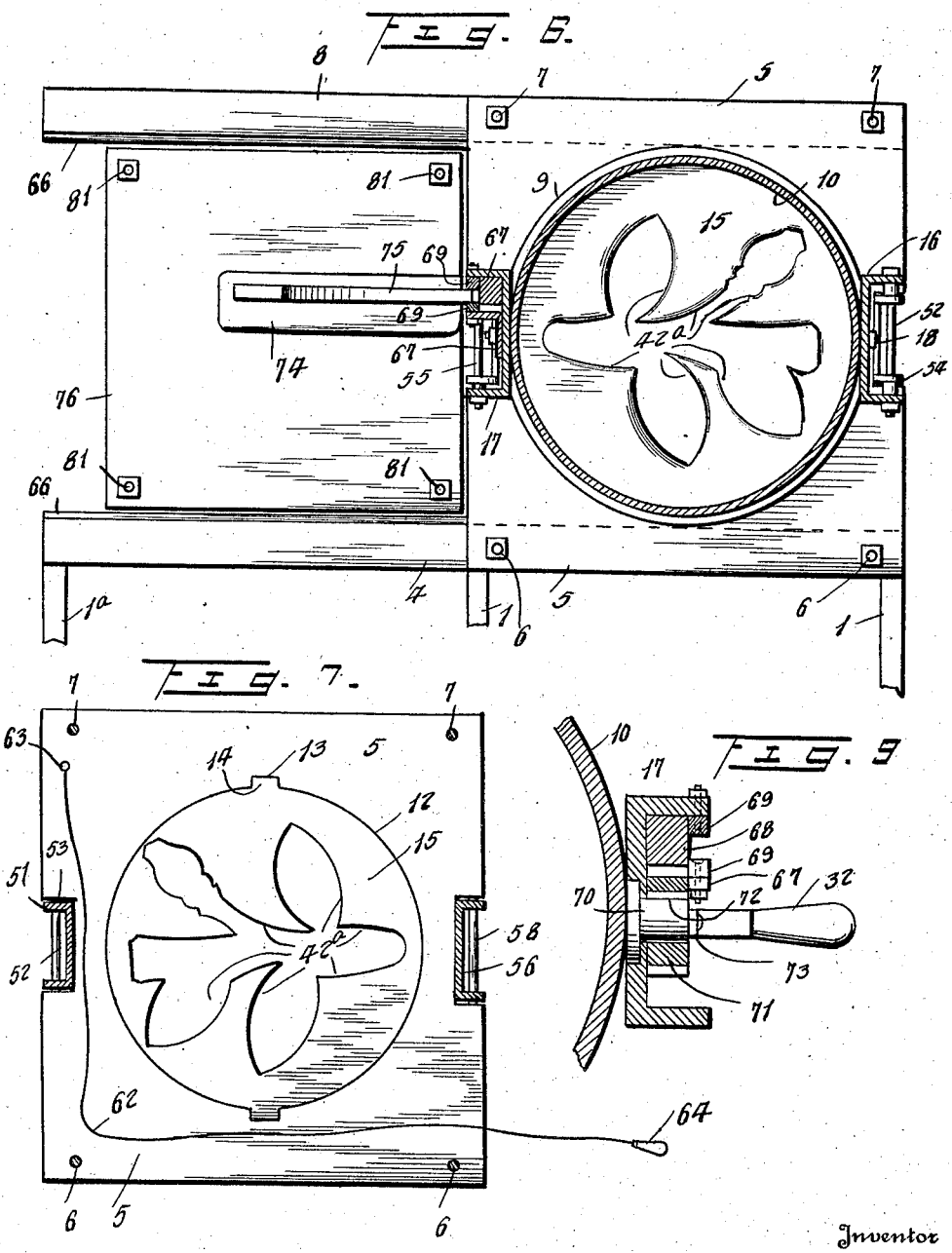

Dec. 14, 1926.
J. KOBERLING
1,610,952
TILE MOLDING MACHINE
Filed April 1, 1926      6 Sheets-Sheet 6
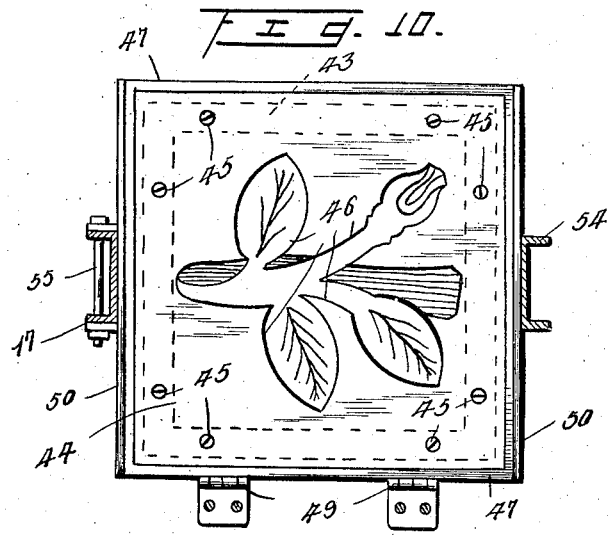
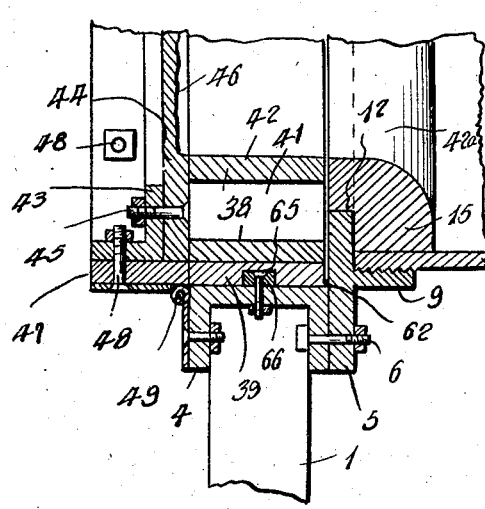
Inventor
J. Koberling.
By
Attorneys Patented Dec. 14, 1926.

1,610,952

UNITED STATES PATENT OFFICE.

JOSEPH KOBERLING, OF TULSA, OKLAHOMA.

TILE-MOLDING MACHINE.

Application filed April 1, 1926. Serial No. 99,150.

This invention relates to certain new and useful improvements in tile molding machines and is primarily designed for forming or molding a tile of a geometrical or floral design for use in the construction of decorative mantels or fireplace walls, the machine being designed for molding the character of tile disclosed in application for patent filed by Joseph Koberling on December 17, 1925, Serial No. 76,057.

A further object of the invention is to provide a tile molding machine wherein a reciprocating plunger moving in a cylinder containing the plastic material to be molded, moves said material through openings in a guide head at the forward end of the cylinder with said openings registering with corresponding openings in a tile mold removably supported at the forward end of the cylinder, the guide head and mold being removable to permit the substitution of other tile molds and guide heads for forming other tile designs.

The molding machine being intended for the forming of tiles for use in the construction of ornamental mantels or fireplace walls, and it being desired to form a fanciful or otherwise artistic face upon the tile, the invention further includes a tile facing plate hingedly supported at the forward end of the machine frame and adapted to occupy a position during the molding operation juxtaposed to the tile mold.

The invention further embodies novel devices for severing the body of plastic material lying within the tile mold from the adjacent body of plastic material in the cylinder and guide head with the tile mold being laterally shiftable relative to the cylinder to a position to be engaged by a plunger for removing the molded tile from the tile mold.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views—

Figure 2:
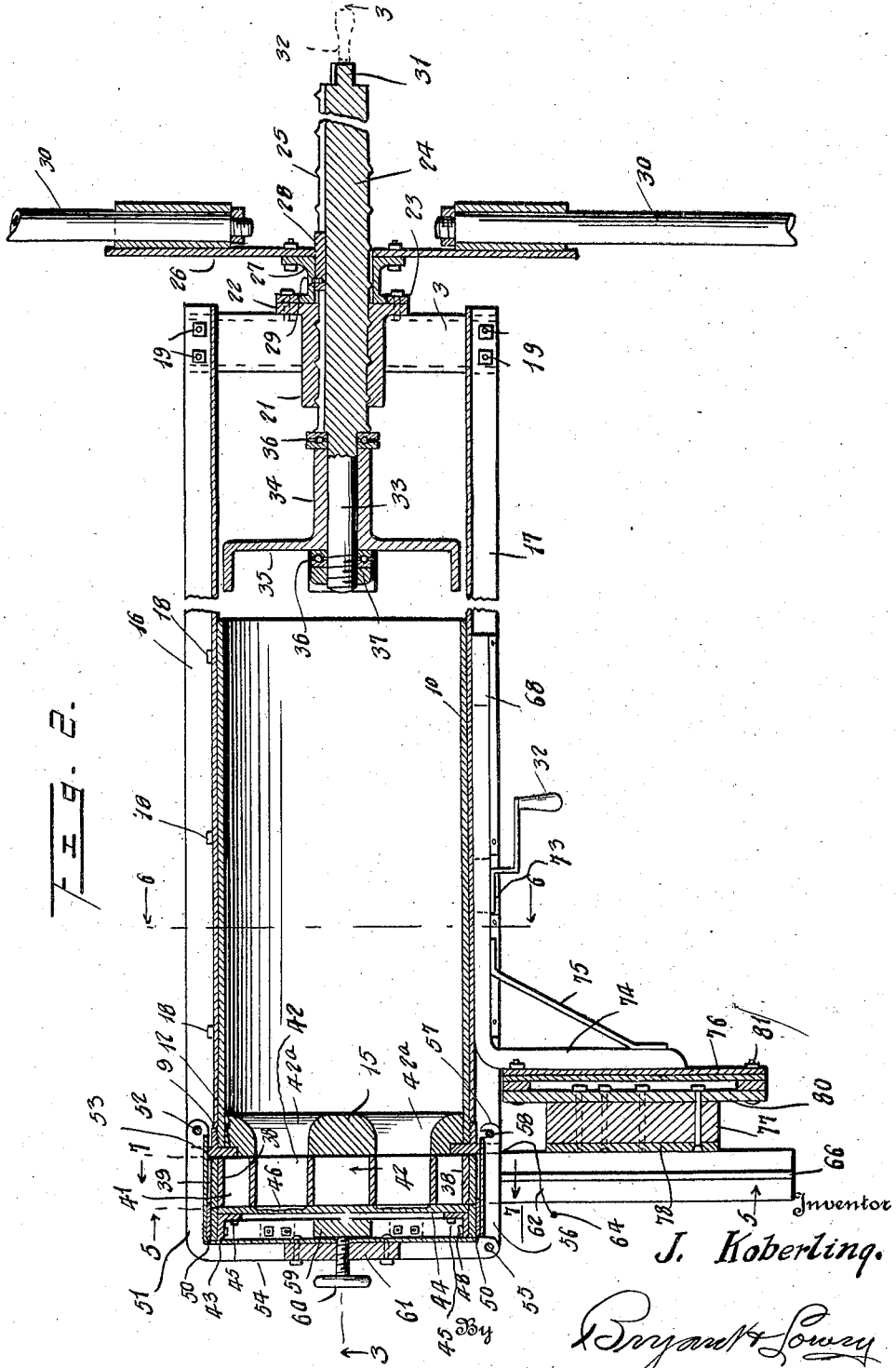

Figure 1 is a side elevational view, partly broken away of a tile molding machine constructed in accordance with the present invention, Figure 2 is a horizontal longitudinal sectional view taken on line 2—2 of Fig. 1 showing the screw operated plunger working in the cylinder that contains the plastic material to form the tile with the dye head for the plastic material at the forward end of the cylinder and the tile mold with the laterally positioned plunger or follower for removing the molded tile from the tile mold.

Figure 3:
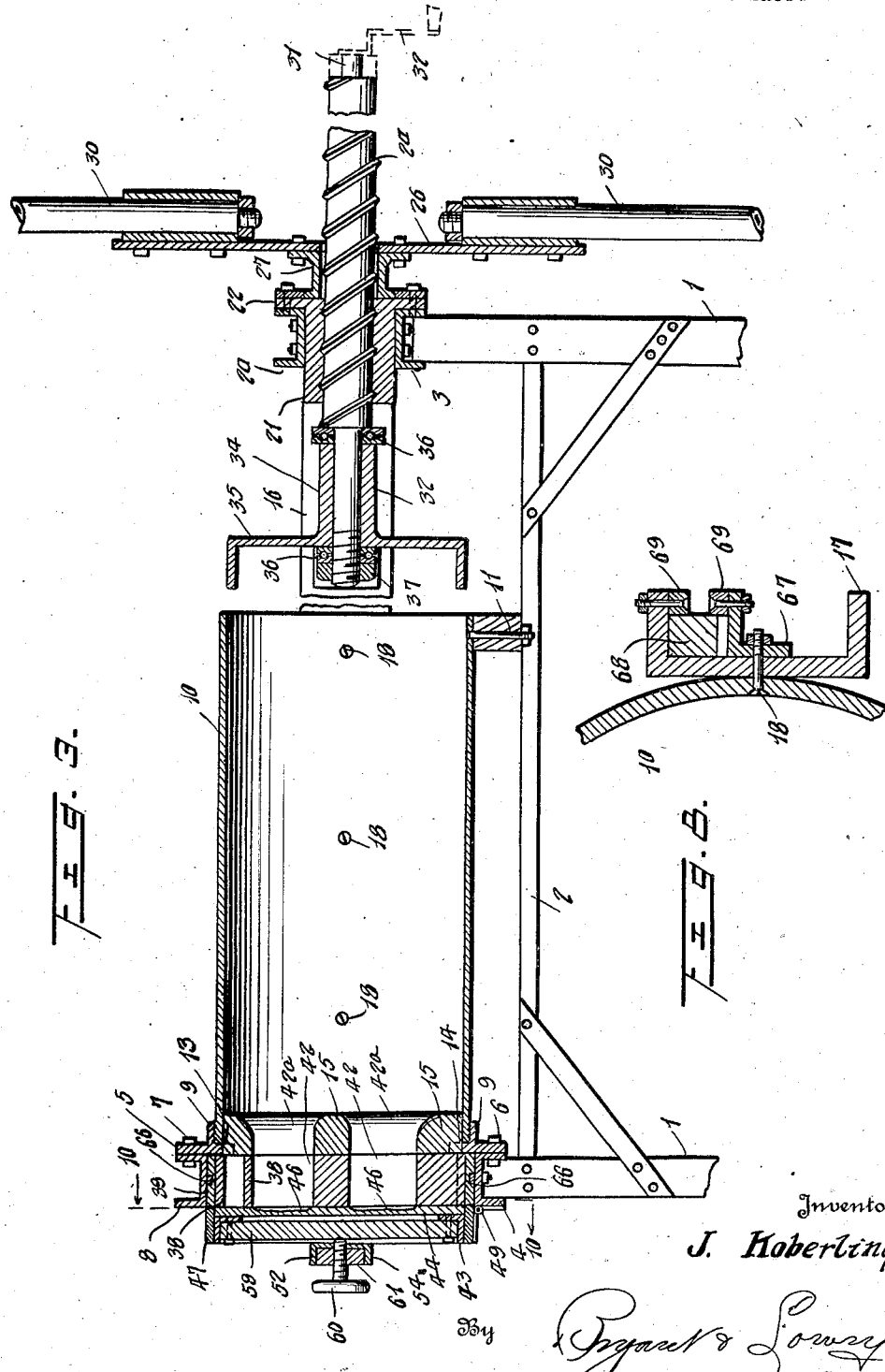
Figure 4:
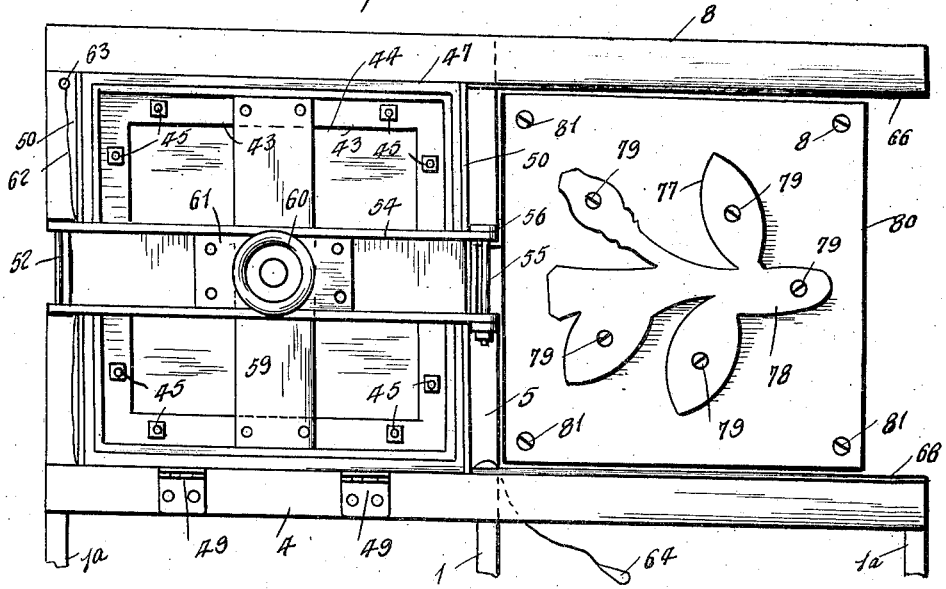
Figure 5:
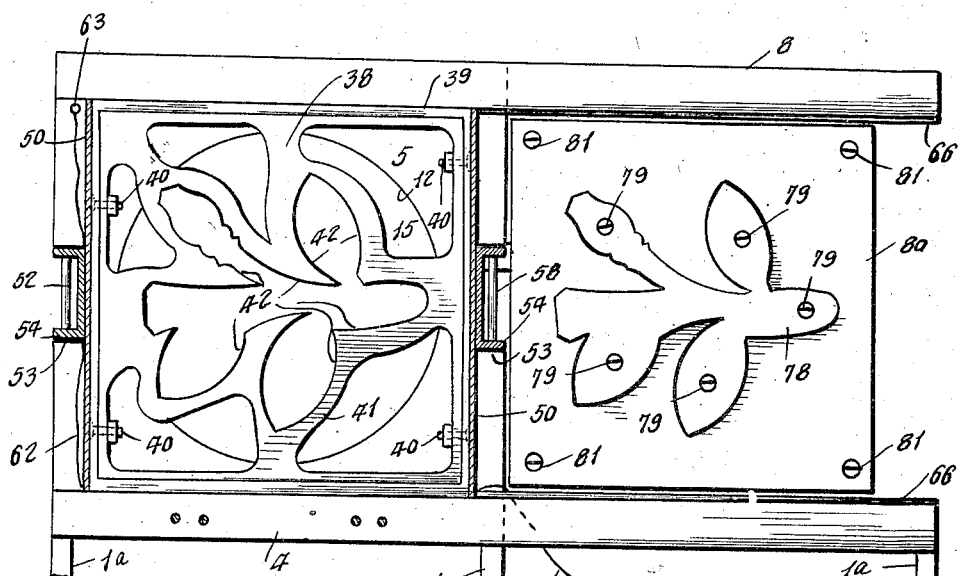

Figure 3 is a vertical longitudinal sectional view taken on line 3—3 of Fig. 2,

Figure 4 is an end elevational view of the outer end of the machine showing the clamping device for holding the face forming plate of the tile in position with the laterally disposed plunger or follower for removing the tile from the mold, Figure 5 is a cross-sectional view taken on line 5—5 of Fig. 2 showing the tile forming mold detachably connected to a carrying frame, Figure 6 is a cross-sectional view taken on line 6—6 of Fig. 2 showing the guide head for the plastic material at the forward end of the cylinder and the support for the follower that removes the tile from the mold, Figure 7 is a cross-sectional view taken on line 7—7 of Fig. 2 showing the outer face of the cylinder guide head, Figure 8 is a detail sectional view taken on line 8—8 of Fig. 1 showing the rack bar and support therefor for operating the follower, Figure 9 is a detail sectional view taken on line 9—9 of Fig. 1 showing the manually operable pinion engaging the follower operating rack bar, Figure 10 is a cross-sectional view taken on line 10—10 of Fig. 3 showing the tile facing plate in front elevation, Figure 11 is an enlarged vertical detail sectional view of the outer end of the cylinder, and Figure 12 is an enlarged detail horizontal sectional view of the outer end of the cylinder.

In the accompanying drawings which show the preferred embodiment of the present invention, there is illustrated a molding machine for forming ornamental tiles of different geometrical or floral designs, preferably for use in the construction of ornamental and fireplace walls, said molding machine embodying a supporting structure comprising legs 1 arranged in pairs at the opposite ends of the frame and connected by longitudinal guide bars 2, the rear legs being of greater height than the forward legs and connected at their upper ends by transverse channel irons 3 and 4 respectively. As shown in Figs. 3, 7, and 11, the plate 5 rectangular in elevation is secured as at 6 to the adjacent side flange of the forward channel iron 4 and said plate 5 carrier at its upper edge as at 7 an upright channel iron 8, the channel irons 4 and 8 extending laterally of the supporting frame structure with the lower angle iron 4 supported at its outer end by the leg 1ª as shown in Fig. 6. An internally threaded annular flange 9 is carried by the inner face of the plate 5 for the reception of the threaded end of the cylinder 10, the inner end of said cylinder being supported upon the longitudinal brace bars by the supporting blocks and anchoring devices 11.

As shown in Fig. 7, the plate 5 is provided with a central circular opening 12 having diametrically opposite key notches 13 to receive key lugs 14 carried by the guide head 15 that is positioned in the forward end of the cylinder 10, the guide head 15 being anchored in position in any suitable manner and having the forward face thereof terminating flush with the forward side of the plate 5 as shown in Fig. 11.

A further support for the cylinder 10 includes the oppositely disposed channel irons 16 and 17 secured to opposite sides of the cylinder as at 18, the rear ends of the channel irons having their lower flanges anchored as at 19 to the channel iron 3 while an upright channel iron 20 connects the upper flanges of the channel irons 16 and 17 above the supporting legs 1 as illustrated. The forward ends of the side channel irons 16 terminate at points adjacent to and inwardly of the forward end of the cylinder.

A piston or plunger is associated with the cylinder to be operated for forcing plastic material in the cylinder through the guide head 15 into a tile mold to be later described and said plunger, mounting and operating means therefor includes an internally threaded block 21 secured between the channel irons 3 and 20 in axial alinement with the cylinder 10, said block carrying an annular flange 22 at its inner end to the inner face of which a retaining ring 23 having a central opening with a beveled wall is attached, as shown in Figs. 2 and 3. A spirally threaded rod 24 is threaded through the fixed block 21 and is longitudinally slotted upon one side thereof as at 25. A handle frame embodying a disk plate 26 has an opening formed centrally of the disk plate with a sleeve 27 secured to the outer side of the disk plate and provided on its forward end with an annular flange having interlocking engagement with the retaining ring 23 for holding the disk plate of the handle frame against movement away from the screw block 21 and permitting rotary movement of the disk plate relative to the screw block. The connection between the disk plate 26 and the rod 24 includes a key or spline 28 fixed as at 29 to the sleeve 27, the key 28 being slidable in the groove 25 of the rod 24 when said rod is moved longitudinally of the screw block 21. Handle bars 30 radiate from the disk plate 26, while the inner end of said rod is provided with a wrench hold 31 for detachable engagement with the wrench or handle 32 so that said rod may be either operated by the handle bars 30 or the handle 32. The forward end of the rod 24 has a reduced cylindrical portion 33 upon which the sleeve 34 of the plunger head 35 is freely mounted, anti-friction bearings 36 being disposed at opposite ends of the sleeves 34 upon said rod end while the plunger 35 is retained on the rod end by the nut 37. When the rod 24 is rotated through the medium of the handle bars 30 or the wrench 32, said rod is moved through the screw block 21 to cause the plunger 35 to enter and move through the cylinder 10 for forcing plastic material therein through the guide head 15.

The tile mold is positioned forwardly of the guide head 15 in line therewith and between the channel irons 4 and 8, the tile mold 38 being rectangular in elevation as shown in Fig. 5 and detachably mounted in the frame 39 by the fastening devices 40. The mold 38 has portions thereof cutaway to reduce the weight as at 41 while the tile design is cutaway as at 42, the design opening 42 extending completely through the mold and registering with a similarly formed opening 42ª in the guide head 15, the identity of the openings 42 and 42ª being discernible in Figs. 5 and 7.

It being the intention to form a facial design upon the tile, the hingedly mounted frame is supported by the outer forward flange of the forward channel iron 4, said frame being of rectangular formation and embodying an angle iron 43 having the face plate 44 detachably connected to one flange thereof as at 45, the inner face of said plate 44 being provided with an indented design 46 corresponding to the openings 42ª in the guide head 15 and the opening 42 in the tile mold, the openings and facial design on the plate 44 being shown in alined positions in Figs. 2, 3 and 11. The frame carrying the facing plate 44 and comprising the angle iron 43 includes an enclosing strip 47 secured as at 48 to the other flange of the angle iron 43, the lower strip 47 of the face plate frame being hinged as at 49 to the forward flange of the channel iron 4, this construction being clearly shown in Figs. 3 and 11. The tile mold being slidable between the channel irons 4 and 8, centering means is provided for alining the guide head 15, tile mold 38 and facing plate 44, such means including side strips 50 carried by the hinged frame and having their inner edges extending in overlapping relations relative to the frame 39 that carries the tile mold as shown in Fig. 12.

A clamp member is provided for holding the spacing plate 44 in its upright operative position and as shown in Figs. 2, 4 and 12, includes an iron of channel formation having the end leg 51 pivotally supported upon the pin 52 that is anchored between the upper and lower flanges of the side channel iron 16, said end leg 51 of the clamp extending through the cutout portion 53 of the adjacent side of the plate 5 and is integrally formed with the cross leg 54. The cross leg 54 of the clamp terminates at the opposite side of the cylinder and has a pivotal connection 55 with the opposite end leg 56 of the clamp, the free end of the leg 56 being provided with hooks 57 to engage the keeper pin 58 anchored between the upper and lower flanges of the adjacent side channel iron 17. To retain the hooks 57 in engagement with the pin 58, a cross strip 59 secured to the angle iron 43 of the hinged frame as shown in Fig. 4 is engaged by the screw 60 carried by the cross leg 54 of the clamp, the cross leg of said clamp carrying a bearing 61 for said operating screw.

With the parts assembled as above described, plastic material in the cylinder 10 is forced therethrough by the plunger 35 when the rod 24 is rotated, the plastic material being forced thru the openings 42$^a$ in the guide head and into the openings 42 in the tile mold, a portion of the plastic material passing forwardly of the tile mold and engaging the facial design 46 upon the facing plate 44, which operation will at once be apparent from an inspection of Figs. 2 and 3. When the plastic material has been thoroughly packed in the tile mold, the wire 62 that is anchored as at 63 to the forward side of the plate 5 is manipulated by the handle 64 to cause the wire to pass upwardly between the guide head 15 and mold 38 for severing the plastic material in the mold from the plastic material in the guide head and cylinder. This operation may be accomplished by releasing the end leg 56 of the clamp. With the clamp positioned laterally the hinged frame carrying the facing plate 44 is moved downwardly upon its hinged mounting 49 to displace the facing plate 44 from the forward side of the tile mold 38.

As shown in Figs. 3 and 11, the outer faces of the upper and lower sides of the frame 39 are longitudinally grooved as at 65 into which longitudinal ribs 66 carried by the adjacent faces of the channel irons 4 and 8 extend, the mold 38 carrying the tile set therein being movable between the channel irons 4 and 8 to be displaced laterally of the cylinder 10 and alined with a follower or plunger device for removing the tile from the mold. The follower and its support, and the operating means therefor are associated with the side channel iron 17, and as shown in Fig. 8, the angle iron 67 secured to the bottom wall of the channel iron 17 has the horizontal leg thereof cooperating with the upper flange of the channel iron 17 to provide a guide for the rack bar 68, the upper flange of the channel iron and the horizontal leg of the angle iron 67 having retaining strips 69 secured thereto for holding the rack bar 68 in position. As shown in Fig. 1, the angle iron 67 has a cutaway portion midway the ends thereof to accommodate the rotatable mounting of the stub shaft 70 in the bottom wall of the channel iron 17, said stub shaft 70 carrying a pinion 71 that is keyed thereto as at 72, the outer end of the stub shaft 70 having a key or wrench end 73 for receiving the handle or wrench 32 that is interchangeable in application to the inner end of the screw rod 24. The rack bar 68 is reciprocable upon rotation of the pinion 71 between the angle iron 67 and the upper flange of the channel iron 17.

The forward end of the rack bar 68 carries an outwardly directed angle arm 74 that is braced with respect to the rack bar by the strut 75 and has a rectangular frame 76 secured to the forward side thereof as shown in Figs. 2 and 6. The follower 77 is of a configuration similar to a design opening 42 in the tile mold and the opening 42$^a$ in the guide head 15 and has a metallic face plate 78 upon the forward end thereof that is secured to the follower 77 by the screws 79 that are also employed for securing the follower 77 to the plate 80 which in turn is secured as at 81 to the frame 76. When the hinged frame carrying the facing plate 44 is released by the hinged clamp and swung downwardly, and the wire 62 moved between the tile molds and guide head to sever the plastic material, the tile mold is moved on the channel irons 4 and 8 to position the mold in alinement with the follower 77. Upon operating the pinion 71, the rack bar carrying the follower is moved forwardly to cause the follower to enter the design opening in the tile mold to eject the tile. The finishing treatment of the tile may be accomplished in any suitable manner, such as by painting or glazing the design face thereof with other treatments, such as baking or the like.

From the above detail description of the machine, it is believed that the construction and operation thereof will be apparent, and while there is herein shown and described the preferred embodiment of the present invention, it is nevertheless to be understood that minor changes may be made therein without departing from the spirit and scope thereof as claimed.

What is claimed is:—

1. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, manually operable means having a splined connection with the screw rod and rotatably interlocked with the screw block for operating the rod and plunger, a sleeve bearing forming a part of the plunger through which the rod is journaled, thrust bearings between the rod and plunger, and a guide head at the forward end of the feeding means having openings therein corresponding to the tile mold openings for directing the plastic material into the mold.

2. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a guide head at the forward end of the feeding means having openings therein corresponding to the tile mold openings for directing the plastic material into the mold, and said mold backing embodying a hinged frame, a face forming plate for the tile carried by the frame and a clamp device for holding the hinged frame alined with the tile mold and guide head.

3. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, a guide head at the forward end of the feeding means having openings therein corresponding to the tile mold openings for directing the plastic material into the mold, and said mold backing embodying a hinged frame, a face forming plate for the tile carried by the frame and a clamp device for holding the hinged frame alined with the tile mold and guide head.

4. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, manually operable means having a splined connection with the screw rod and rotatably interlocked with the screw block for operating the rod and plunger, a guide head at the forward end of the feeding means having openings therein corresponding to the tile mold openings for directing the plastic material into the mold, and said mold backing embodying a hinged frame, a face forming plate for the tile carried by the frame and a clamp device for holding the hinged frame alined with the tile mold and guide head.

5. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, manually operable means having a splined connection with the screw rod and rotatably interlocked with the screw block for operating the rod and plunger, a sleeve bearing forming a part of the plunger through which the rod is journaled, thrust bearings between the rod and plunger, a guide head at the forward end of the feeding means having openings therein corresponding to the tile mold openings for directing the plastic material into the mold, and said mold backing embodying a hinged frame, a face forming plate for the tile carried by the frame and a clamp device for holding the hinged frame alined with the tile mold and guide head.

6. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a guide head at the forward end of the feeding means having openings therein corresponding to the tile mold openings for directing the plastic material into the mold, said mold backing embodying a hinged frame, a face forming plate for the tile carried by the frame and a clamp device for holding the hinged frame alined with the tile mold and guide head, a laterally extending guide track over which the tile mold is movable and said ejecting means including a sliding rack bar and a follower on the forward end of the rack bar to be moved into ejecting relation to the laterally shifted mold.

7. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, a guide head at the forward end of the feeding means having openings therein corresponding to the tile mold openings for directing the plastic material into the mold, said mold backing embodying a hinged frame, a face forming plate for the tile carried by the frame and a clamp device for holding the hinged frame alined with the tile mold and guide head, a laterally extending guide track over which the tile mold is movable and said ejecting means including a sliding rack bar and a follower on the forward end of the rack bar to be moved into ejecting relation to the laterally shifted mold.

8. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, manually operable means having a splined connection with the screw rod and rotatably interlocked with the screw block for operating the rod and plunger, a guide head at the forward end of the feeding means having openings therein corresponding to the tile mold openings for directing the plastic material into the mold, said mold backing embodying a hinged frame, a face forming plate for the tile carried by the frame and a clamp device for holding the hinged frame alined with the tile mold and guide head, a laterally extending guide track over which the tile mold is movable and said ejecting means including a sliding rack bar and a follower on the forward end of the rack bar to be moved into ejecting relation to the laterally shifted mold.

9. In a tile molding machine, a tile mold, a backing for the mold, means for feeding plastic material into the mold, means to permit lateral shifting movement of the mold, means for ejecting the tile from the mold, said feeding means including a cylinder, a plunger reciprocable in the cylinder, a screw block mounting for the plunger, a screw rod carrying the plunger working in the block, manually operable means having a splined connection with the screw rod and rotatably interlocked with the screw block for operating the rod and plunger, a sleeve bearing forming a part of the plunger through which the rod is journaled, thrust bearings between the rod and plunger, a guide head at the forward end of the feeding means having openings therein corresponding to the tile mold openings for directing the plastic material into the mold, said mold backing embodying a hinged frame, a face forming plate for the tile carried by the frame and a clamp device for holding the hinged frame alined with the tile mold and guide head, a laterally extending guide track over which the tile mold is movable and said ejecting means including a sliding rack bar and a follower on the forward end of the rack bar to be moved into ejecting relation to the laterally shifted mold.

In testimony whereof I affix my signature.

JOSEPH KOBERLING.